United States Patent [19]

Lee et al.

[11] Patent Number: 5,118,326
[45] Date of Patent: Jun. 2, 1992

[54] VITRIFIED BONDED GRINDING WHEEL WITH MIXTURES OF SOL GEL ALUMINOUS ABRASIVES AND SILICON CARBIDE

[75] Inventors: Ken W. Lee, Holden; Charles V. Rue, Petersham, both of Mass.

[73] Assignee: Norton Company, Worcester, Mass.

[21] Appl. No.: 519,609

[22] Filed: May 4, 1990

[51] Int. Cl.⁵ .............................................. B24D 3/02
[52] U.S. Cl. ........................................ 51/309; 51/298; 51/307; 51/308
[58] Field of Search .................. 51/298, 307, 308, 309

[56] References Cited

U.S. PATENT DOCUMENTS

| | | | |
|---|---|---|---|
| 4,314,827 | 2/1982 | Leitheiser et al. | 51/298 |
| 4,543,107 | 9/1985 | Rue | 51/309 |
| 4,662,897 | 5/1987 | Atkinson et al. | 51/309 |
| 4,741,743 | 5/1988 | Narayanan et al. | 51/298 |
| 4,744,802 | 5/1988 | Schwabel | 51/309 |
| 4,800,685 | 1/1989 | Haynes, Jr. | 51/298 |
| 4,883,501 | 11/1989 | Haynes, Jr. | 51/309 |

Primary Examiner—William R. Dixon, Jr.
Assistant Examiner—Willie J. Thompson
Attorney, Agent, or Firm—David Bennett

[57] ABSTRACT

Vitrified bonded grinding wheels which contain a mixture of sintered sol gel aluminous abrasive and silicon carbide abrasive are substantially and surprisingly better than those with either abrasive component alone, in their ability to abrade certain metals.

10 Claims, No Drawings

VITRIFIED BONDED GRINDING WHEEL WITH MIXTURES OF SOL GEL ALUMINOUS ABRASIVES AND SILICON CARBIDE

TECHNICAL FIELD

The invention relates to vitrified bonded grinding wheels and more specifically to vitrified bonded grinding wheels containing a mixture of a sintered aluminous abrasive and a non-sintered abrasive.

BACKGROUND OF THE INVENTION

The abrasive grain portion of the majority of vitreous-bonded grinding wheels in commercial use is composed of either fused aluminum oxide or silicon carbide. Those skilled in the art of grinding select silicon carbide as the preferred abrasive when the object to be ground is titanium, a super alloy, a low-tensile ferrous alloy, or a nonmetallic such as stone, ceramic, or glass. Similarly, those skilled in grinding select fused aluminum oxide for grinding steels, hardened or soft.

The use of mixtures of silicon carbide abrasive grains with fused aluminum oxide abrasive grains in the manufacture of grinding wheels and other abrasive bodies is known in the art and produces a product with properties intermediate to either abrasive type used singly. Such mixed abrasive type wheels are used where a single wheel must grind a wide variety of materials and need not be optimum for any single material. The grinding performance is usually intermediate between that of either abrasive type used alone.

SUMMARY OF THE INVENTION

The present invention provides a vitreous-bonded mixed abrasive grinding article in which the abrasive grit portion is composed of silicon carbide grains plus sintered sol-gel alumina grains. The invention grinding articles provide substantial and unexpected benefits in the grinding of certain hard-to-grind metals over and above the results obtained using either type of abrasive grain alone.

The present invention provides a sol gel alumina based vitreous bonded grinding wheel that is well adapted for use in a wide range of applications including those for which alumina based wheels have usually been considered unsuitable.

The present invention further provides an abrasive article comprising a sintered sol gel aluminous abrasive and a vitreous bond which demonstrates excellent grinding performance that is quite unexpected in the circumstances.

The present invention resides in the discovery that when certain superior sintered sol gel aluminous abrasives are blended with silicon carbide in certain proportions in a vitrified bond, a product results which is not inferior to a grinding wheel wherein the abrasive is all sintered sol gel aluminous abrasive and in fact in some cases, produces a product the grinding properties of which are actually superior to the product which contains 100% of the sintered sol gel aluminous abrasive. Novel and useful grinding wheels result from replacing from 10 to 90 and preferably 30 to 70 by volume of the sintered sol gel aluminous abrasive with silicon carbide.

DETAILED DESCRIPTION OF THE INVENTION

The invention is concerned with vitrified bonded grinding wheels which contain certain sintered sol gel aluminous abrasives blended with silicon carbide in certain proportions. There are several sintered aluminous abrasives currently in existence including sintered bauxite based abrasives and co-sintered alumina-zirconia. Sol gel aluminous abrasive grits are taught, for example, in U.S. Pat. No. 4,314,827. However the abrasives most conveniently used in the present invention are the newer sol gel types of alumina based abrasives taught by U.S. Pat. No. 4,623,364. The grain is made by preparing an aqueous gel of submicron sized hydrated alumina particles with an effective amount of submicron seed crystals, drying the gel, crushing the dried gel to a desired size, and firing the green grains at between about 1100° C. and 1500° C. Alternatively, the gel can be extruded in the form of filaments, dried, broken to the desired size and fired to form a microcrystalline abrasive grit with a substantially constant cross-section and an aspect ratio greater than 1. The resulting abrasive is such that each abrasive grain is made up of numerous submicron sized alpha alumina crystals and has a hardness of at least 16 and preferably at least 18 GPa. Such abrasives are commonly referred to as "seeded gel abrasives". The seed material can also be any other material such as ferric oxide or any other material that is substantially isostructural with alpha alumina under the reaction conditions following known principles of crystal propagation and growth.

The silicon carbide component of the abrasive blend can be, for example, the grit available as Crystolon® from Norton Company. The grit can be either the green or the black silicon carbide varieties. Preferably the grit size of both abrasive components is from about 20 to about 240 such as from about 30 to about 160 and most conveniently from about 40 to about 120 mesh. The two abrasives may each be present in the wheel in quantities of about 10% to about 40% by volume, based on the total volume of the wheel. The wheels themselves are usually made up of from about 30% to about 56% by volume of combined abrasive, about 2.5% to about 50% by volume of vitrified bond, and about 5% to about 65% by volume of pores though proportions outside these ranges can be used if desired in special applications.

As pointed out in U.S. Pat. No. 4,543,107 sintered sol gel aluminous abrasives, unlike the non-sintered type, can be susceptible to damage by inorganic glassy bonds at elevated temperatures. Therefore the bonds employed in the present invention should preferably be formulated so that they mature at 1220° C. or lower and even more preferably at 1100° C. or lower. In addition to the usual inorganic materials that go into vitrified or inorganic glassy bonds for grinding wheels, the bond may also incorporate therein beneficial fillers such as mullite, kyanite, bubble alumina, and the like.

While the discussion and data herein is directed to grinding wheels, it should be understood that abrasive articles such as sharpening stones, segments, and the like, are within the scope of the invention.

EXAMPLE I

A series of grinding tests were performed to illustrate the advantageous properties of the abrasive grit blends of the invention. In each case the grits were bonded with a bond, which comprised 30% Kentucky-Tennessee Clay CO's No. 5 ball clay and 70% of a glass frit with a silica content of from 40 to 65% weight, which had no deleterious affect on the grain when fired to a working temperature of 1100° C. or lower. The bond, on a mole percentage basis had the following approximate composition:

| | |
|---|---|
| 72% | SiO$_2$ |
| 10% | Al$_2$O$_3$ |
| 7% | B$_2$O$_3$ |
| 5% | Na$_2$O |
| 4% | K$_2$O |
| 1% | CaO |
| ½% | TiO$_2$ |
| ½% | MgO |
| ½% | Fe$_2$O$_3$ |

The mixture was formed into a 12.7 cm wheel with a thickness of 0.64 cm. Each wheel after firing contained 48% by volume of total abrasive grit.

The sintered sol-gel aluminous grits used in the following Examples were seeded sol-gel grits made by Norton company having a grit size of 60 and a hardness in excess of 18 GPa. The green or black silicon carbide used also had a grit size of 60. The amount of bond in each case represented 11.55% of the total volume of the wheel.

The wheels were tested in an oil cooled plunge grinding rig on four different metal billets: titanium 6Al-4V; stainless steel 440° C.; stainless steel 302 and Titanium metal. Wheel rotation was 4970 rpm and the table speed was 15.4 m/min.

The results on the four metals are set out in the following Tables:

TABLE I

| | Titanium Alloy | | | |
|---|---|---|---|---|
| Grits | MRR cc/min.cm | WWR c/min.cm | G Ratio | Power Watts/cm |
| A. 100% SiC Green | 1.74 | 0.65 | 2.66 | 2088 |
| 50% SiC/50% SG | 1.63 | 0.85 | 1.92 | 1753 |
| 100% SG | 1.55 | 1.05 | 1.48 | 2479 |
| B. 100% SiC Black | 1.74 | 0.68 | 2.58 | 2044 |
| 50% SiC/50% SG | 1.62 | 0.82 | 1.96 | 1871 |
| 100% SG | 1.55 | 1.05 | 1.48 | 2479 |
| C. 100% SiC Green | 3.17 | 2.05 | 1.54 | 2637 |
| 50% SiC/50% SG | 2.98 | 2.53 | 1.18 | 2209 |
| 100% SG | 3.02 | 2.40 | 1.26 | 3034 |
| D. 100% SiC Black | 3.25 | 1.95 | 1.66 | 2684 |
| 50% SiC/50% SG | 3.10 | 2.35 | 1.32 | 2276 |
| 100% SG | 3.02 | 2.40 | 1.26 | 3034 |

A and C used green SiC and B and D used black SiC.
A and B used a unit feed advance of 0.013 mm and a total depth of cut of 1.31 mm.
C and D used a unit feed advance of 0.026 mm and a total depth of cut of 1.3 mm.

TABLE II

| | 440C Stainless Steel | | | |
|---|---|---|---|---|
| Grits | MRR cc/min.cm | WWR c/min.cm | G Ratio | Power Watts/cm |
| A. 100% SiC Green | 1.95 | 0.085 | 22.86 | 4814 |
| 50% SiC/50% SG | 1.95 | 0.008 | 254.09 | 1319 |
| 100% SG | 1.97 | 0.010 | 191.42 | 1689 |
| B. 100% SiC Black | 1.94 | 0.085 | 22.8 | 4732 |
| 50% SiC/50% SG | 1.97 | 0.010 | 192.63 | 1228 |
| 100% SG | 1.97 | 0.010 | 191.42 | 1689 |
| C. 100% SiC Green | 3.83 | 0.262 | 14.63 | 6602 |
| 50% SiC/50% SG | 3.93 | 0.030 | 128.74 | 1730 |
| 100% SG | 3.93 | 0.025 | 154.37 | 2590 |
| D. 100% SiC Black | 3.83 | 0.332 | 11.53 | 6479 |
| 50% SiC/50% SG | 3.91 | 0.025 | 154.86 | 1809 |
| 100% SG | 3.93 | 0.025 | 154.37 | 2590 |

A and C used green SiC and B and D used black SiC.
A and B used a unit feed advance of 0.013 mm and a total depth of cut of 1.3 mm.
C and D used a unit feed advance of 0.026 mm and a total depth of cut of 2.54 mm.

TABLE III

| | 302 Stainless Steel | | | |
|---|---|---|---|---|
| Grits | MRR cc/min.cm | WWR c/min.cm | G Ratio | Power Watts/cm |
| A. 100% SiC Green | 3.89 | 0.255 | 15.28 | 9366 |
| 50% SiC/50% SG | 3.90 | 0.055 | 70.84 | 2737 |
| 100% SG | 3.89 | 0.055 | 69.78 | 2652 |
| B. 100% SiC Black | 3.93 | 0.323 | 12.18 | 9636 |
| 50% SiC/50% SG | 3.93 | 0.040 | 98.68 | 2464 |
| 100% SG | 3.89 | 0.055 | 69.78 | 2652 |
| C. 100% SiC Green | 7.11 | 1.783 | 3.98 | 11084 |
| 50% SiC/50% SG | 7.86 | 0.495 | 15.87 | 5096 |
| 100% SG | 7.74 | 0.211 | 36.69 | 8200 |
| D. 100% SiC Black | 7.20 | 1.827 | 3.94 | 11915 |
| 50% SiC/50% SG | 7.70 | 0.511 | 15.08 | 5222 |
| 100% SG | 7.74 | 0.211 | 36.69 | 8200 |

A and C used green SiC and B and D used black SiC.
A and B used a unit feed advance of 0.025 mm and a total depth of cut of 2.54 mm.
C and D used a unit feed advance of 0.051 and a total depth of cut of 2.54 mm.

TABLE IV

| | TITANIUM - OIL | | | |
|---|---|---|---|---|
| GRITS | MRR cc/min.cm | WWR cc/min.cm | G-RATIO | POWER watts/cm |
| 100% SiC green | 1.79 | 0.539 | 3.32 | 2122 |
| 50% SiC/50% SG | 1.75 | 0.679 | 2.58 | 1739 |
| 30% SiC green 70% SG | 1.75 | 0.777 | 2.25 | 1890 |
| 100% SG | 1.74 | 0.699 | 2.49 | 1985 |
| 100% SiC green | 4.27 | 5.755 | 0.74 | 2836 |
| 50% SiC/50% SG | 4.32 | 5.339 | 0.81 | 2130 |
| 30% SiC/70% SG | 4.44 | 4.818 | 0.92 | 2596 |
| 100% SG | 4.56 | 4.465 | 1.02 | 2765 |

The above data demonstrate clearly that although, as might be anticipated, the G-ratio of the mixture is generally intermediate between the extremes represented by the component grits used alone, or else very close to that of the premium SG grit figure, the corresponding power drawdown to achieve that G ratio is significantly lower than with either component grit alone.

This is an unexpected result that could not have been predicted on the basis of the known behavior of the component grits. In an efficient grinding operation it is important to have a wheel with a long life that remains sharp that uses the lowest possible power drawdown to achieve the desired cut. The data clearly shows that the grit combinations of the present invention meet this requirement, especially in the context of grinding stainless steel.

The beneficial results detailed above are most surprising in view of the fact that they are secured by the incorporation of a grit that would normally be expected to have a deleterious effect on the metals ground. Indeed the data for SiC grit wheels indicates that their performance on stainless steels is poor and the performance of aluminous wheels on titanium alloys is likewise relatively inferior. Yet the performance of the blend is superior on all of these.

EXAMPLE II

The procedures of Example I were repeated except that the wheels were tested using a coolant that was a water soluble oil. The results are reported in Tables V to VII below. As can be seen, the pattern of results largely duplicates that found in Example I.

TABLE V

Titanium Alloy

| Grits | MRR cc/min.cm | WWR c/min.cm | G Ratio | Power Watts/cm |
|---|---|---|---|---|
| A. 100% SiC Green | 1.61 | 0.843 | 1.91 | 1850 |
| 50% SiC/50% SG | 1.59 | 0.944 | 1.68 | 1492 |
| 100% SG | 1.68 | 0.798 | 2.11 | 1939 |
| B. 100% SiC Black | 1.70 | 0.857 | 1.98 | 1676 |
| 50% SiC/50% SG | 1.61 | 0.921 | 1.74 | 1522 |
| 100% SG | 1.68 | 0.798 | 2.11 | 1689 |
| C. 100% SiC Green | 3.19 | 2.182 | 1.46 | 2276 |
| 50% SiC/50% SG | 2.94 | 2.624 | 1.12 | 1618 |
| 100% SG | 3.17 | 1.920 | 1.65 | 2645 |
| D. 100% SiC Black | 3.11 | 2.355 | 1.32 | 2072 |
| 50% SiC/50% SG | 3.02 | 2.477 | 1.22 | 1857 |
| 100% SG | 3.17 | 1.920 | 1.65 | 2645 |

A and C used green SiC and B and D used black SiC.
A and B used a unit feed advance of 0.013 mm and a total depth of cut of 1.3 mm
C and D used a unit feed advance of 0.026 mm and a total depth of cut of 1.3 mm.

TABLE VI

440C Stainless Steel

| Grits | MRR cc/min.cm | WWR c/min.cm | G Ratio | Power Watts/cm |
|---|---|---|---|---|
| A. 100% SiC Green | 1.86 | 0.205 | 9.01 | 5040 |
| 50% SiC/50% SG | 1.93 | 0.031 | 61.42 | 1875 |
| 100% SG | 1.95 | 0.027 | 72.02 | 2161 |
| B. 100% SiC Black | 1.83 | 0.312 | 5.85 | 4012 |
| 50% SiC/50% SG | 1.94 | 0.029 | 67.34 | 1783 |
| 100% SG | 1.95 | 0.027 | 72.02 | 2161 |
| C. 100% SiC Green | 3.51 | 0.932 | 3.76 | 4914 |
| 50% SiC/50% SG | 3.89 | 0.068 | 57.63 | 2245 |
| 100% SG | 3.85 | 0.029 | 130.75 | 3213 |
| D. 100% SiC Black | 3.50 | 0.995 | 3.51 | 4429 |
| 50% SiC/50% SG | 3.84 | 0.078 | 49.16 | 2387 |
| 100% SG | 3.85 | 0.029 | 130.75 | 3213 |

A and C used green SiC and B and D used black SiC.
A and B used a unit feed advance of 0.013 mm and a total depth of cut of 1.3 mm
C and D used a unit feed advance of 0.026 mm and a total depth of cut of 2.54 mm.

TABLE VII

302 Stainless Steel

| Grits | MRR cc/min.cm | WWR c/min.cm | G Ratio | Power Watts/cm |
|---|---|---|---|---|
| A. 100% SiC Green | 3.21 | 1.649 | 1.95 | 4104 |
| 50% SiC/50% SG | 3.26 | 1.510 | 2.16 | 1998 |
| 100% SG | 3.42 | 1.123 | 3.05 | 2852 |
| B. 100% SiC Black | 3.23 | 1.690 | 1.91 | 3942 |
| 50% SiC/50% SG | 3.32 | 1.415 | 2.35 | 2087 |
| 100% SG | 3.42 | 1.123 | 3.05 | 2853 |
| C. 100% SiC Green | 5.62 | 5.284 | 1.06 | 4104 |
| 50% SiC/50% SG | 5.22 | 6.184 | 0.84 | 1815 |
| 100% SG | 5.96 | 4.253 | 1.40 | 3379 |
| D. 100% SiC Black | 5.72 | 4.830 | 1.18 | 3824 |
| 50% SiC/50% SG | 5.26 | 5.863 | 0.90 | 1857 |
| 100% SG | 5.96 | 4.253 | 1.40 | 3379 |

A and C used green SiC and B and D used black SiC.
A and B used a unit feed advance of 0.025 mm and a total depth of cut of 2.54 mm.
C and D used a unit feed advance of 0.051 mm and a total depth of cut of 2.54 mm.

EXAMPLE III

In this Example, Titanium Alloy (6AC-4V) and Titanium metal were evaluated in the manner described above in the previous Examples. The results are set forth in Tables VIII, IX and X.

TABLE VIII

TITANIUM ALLOY

| GRITS | MRR CC/MIN. CM | WWR CC/MIN. CM | G-RATIO | POWER WATTS/CM |
|---|---|---|---|---|
| A. 100% SiC Green | 1.64 | .836 | 1.96 | 1721 |
| 70% SiC/30% SG | 1.63 | .865 | 1.89 | 1689 |
| 50% SiC/50% SG | 1.61 | .894 | 1.77 | 1513 |
| 100% SG | 1.67 | .784 | 2.13 | 1963 |
| B. 100% SiC Green | 3.10 | 2.237 | 1.39 | 2107 |
| 70% SiC/30% SG | 3.02 | 2.322 | 1.30 | 2123 |
| 50% SiC/50% SG | 2.90 | 2.515 | 1.16 | 1827 |
| 100% SG | 3.17 | 1.906 | 1.66 | 2529 |

A = Used a downfeed of 0.013 mm.
B = Used a downfeed of 0.0254 mm.
The data shown above are averages of two data points. The cooling oil used was a water soluble oil called Trim VHPE 300 (at 5% concentration) from Master Chemical Company.

TABLE IX

TITANIUM ALLOY

| GRITS | MRR CC/MIN. CM | WWR CC/MIN. CM | G-RATIO | POWER WATTS/CM |
|---|---|---|---|---|
| A. 100% SiC Green | 1.86 | .521 | 3.57 | 2291 |
| 70% SiC/30% SG | 1.80 | .430 | 4.19 | 2100 |
| 50% SiC/50% SG | 1.78 | .488 | 3.65 | 2088 |
| 100% SG | 1.71 | .590 | 2.90 | 6115 |
| B. 100% SiC Green | 3.41 | 1.283 | 2.65 | 2834 |
| 70% SiC/30% SG | 3.41 | 2.287 | 1.49 | 2165 |
| 50% SiC/50% SG | 3.33 | 2.351 | 1.42 | 2411 |
| 100% SG | 3.44 | 1.309 | 2.63 | 7160 |

A used a 0.013 mm downfeed.
B used a 0.0254 mm downfeed.
The cooling oil was W & B Oil 1572.

TABLE X

TITANIUM METAL

| GRITS | MRR CC/MIN. CM | WWR CC/MIN. CM | G-RATIO | POWER WATTS/CM |
|---|---|---|---|---|
| A. 100% SiC Green | 1.79 | 0.539 | 3.32 | 2122 |
| 50% SiC/50% SG | 1.75 | 0.679 | 2.58 | 1739 |
| 30% SiC/70% SG | 1.75 | 0.777 | 2.25 | 1890 |
| 100% SG | 1.74 | 0.699 | 2.49 | 1985 |
| B. 100% SiC Green | 4.27 | 5.755 | 0.75 | 2836 |

TABLE X-continued

| GRITS | TITANIUM METAL | | | |
|---|---|---|---|---|
| | MRR CC/MIN. CM | WWR CC/MIN. CM | G-RATIO | POWER WATTS/ CM |
| 50% SiC/50% SG | 4.32 | 5.339 | 0.81 | 2130 |
| 30% SiC/70% SG | 4.44 | 4.818 | 0.92 | 2596 |
| 100% SG | 4.56 | 4.465 | 1.02 | 2765 |

A used a 0.013 mm downfeed
B used a 0.0254 mm downfeed.
The cooling oil was W & B Oil 1572.

What is claimed is:

1. A vitrified bonded abrasive article comprised of abrasive grains and an inorganic glassy bond therefor wherein said abrasive grains consist essentially of a mixture of from about 10 to about 90% by volume of sintered seeded sol gel aluminous abrasive grains and correspondingly from about 90 to about 10% by volume of silicon carbide grains.

2. The vitrified bonded abrasive article of claim 1 wherein said abrasive grains are present in an amount of from 30% to 56% by volume of said article, said glassy bond is present in an amount of from 2.5% to 50% by volume of said article and the article includes 5% to 65% by volume pores.

3. The vitrified bonded abrasive article of claim 1 wherein said abrasive grains are made up of sintered seeded sol gel aluminous abrasive grains in an amount of from about 1% to 55% by volume of said article and said silicon carbide grains are present in an amount of 1% to 55% by volume of said article.

4. The vitrified bonded abrasive article of claim 1 wherein said inorganic glassy bond is matured at 1200° C. or below.

5. A vitrified bonded abrasive article according to claim 1 wherein each sintered seeded sol gel aluminous abrasive grain is comprised of submicron sized alpha alumina crystals and has a hardness of at least 16 GPa.

6. A vitrified bonded abrasive article according to claim 1 wherein each sintered seeded sol gel aluminous abrasive grain is comprised of submicron sized alpha alumina crystals and has a hardness of at least 18 GPa and silicon carbide particles having a mesh size of from 20 to 240.

7. A vitrified bonded abrasive article according to claim 1 wherein the sintered seeded sol gel aluminous abrasive is substantially calcium ion and alkali metal ion free and has a substantially homogeneous microcrystalline structure comprising a secondary phase of crystallites comprising a modifying component in a dominant continuous alumina phase comprising alpha alumina, said modifying component, on a volume percent of fired solids of said sintered sol gel aluminous abrasives, being selected from:

(i) at least 10% of zirconia, hafnia, or a combination of zirconia and hafnia, (ii) at least 1% of a spinel derived from alumina and at least one oxide of a metal selected from cobalt, nickel, zinc, or magnesium or (iii) 1-45% of said zirconia, hafnia, or the combination of zirconia and hafnia and at least 1% of said spinel.

8. A vitrified bonded abrasive article according to claim 1 which includes a filler selected from the group consisting of mullite, kyanite, and mixtures thereof.

9. A vitrified bonded abrasive article comprised of abrasive grains and an inorganic glassy bond therefor wherein said abrasive grains consist essentially of about 70% to about 30% of seeded sol gel aluminous abrasive grains and correspondingly from about 30% to about 70% of grains of silicon carbide.

10. A vitrified bonded abrasive article according to claim 9 in which the mesh size of the grains of each abrasive component is from 24 to 240.

* * * * *